United States Patent
Williams et al.

(10) Patent No.: US 11,080,106 B2
(45) Date of Patent: Aug. 3, 2021

(54) EVENT MONITORING IN A MULTI-THREADED DATA PROCESSING APPARATUS

(71) Applicant: ARM LIMITED, Cambridge (GB)

(72) Inventors: Michael John Williams, Ely (GB); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 1115 days.

(21) Appl. No.: 15/066,453

(22) Filed: Mar. 10, 2016

(65) Prior Publication Data

US 2016/0292021 A1    Oct. 6, 2016

(30) Foreign Application Priority Data

Apr. 2, 2015    (GB) ..................... 1505777

(51) Int. Cl.
G06F 9/54    (2006.01)
(52) U.S. Cl.
CPC ................... G06F 9/542 (2013.01)
(58) Field of Classification Search
None
See application file for complete search history.

(56) References Cited

U.S. PATENT DOCUMENTS

| | | |
|---|---|---|
| 5,297,283 A | 3/1994 | Kelly, Jr. et al. |
| 2005/0183065 A1 | 8/2005 | Wolczko et al. |
| 2009/0290712 A1 | 11/2009 | Henry et al. |
| 2012/0089979 A1 | 4/2012 | Adar et al. |
| 2013/0179886 A1 | 7/2013 | Frazier et al. |

FOREIGN PATENT DOCUMENTS

| | | |
|---|---|---|
| CN | 1276888 | 12/2000 |
| CN | 102124442 | 7/2011 |
| CN | 103218572 | 7/2013 |
| CN | 104216683 | 12/2014 |

OTHER PUBLICATIONS

Search Report for GB 1505777.1 dated Sep. 28, 2015 (4 pages).
First Office Action for CN Application No. 201610180138.3 dated Jun. 12, 2020 and English translation, 29 pages.
Office Action for TW Application No. 105104648 dated Jun. 12, 2020 and English translation, 19 pages.
Second Office Action for CN Application No. 201610180138.3 dated Mar. 16, 2021 and English translation, 19 pages.

*Primary Examiner* — Theodore C Parsons
*Assistant Examiner* — Bruce S Ashley
(74) *Attorney, Agent, or Firm* — Nixon & Vanderhye P.C.

(57) ABSTRACT

In an apparatus performing multi-threaded data processing event handling circuitry receives event information from the data processing circuitry indicative of an event which has occurred during the data processing operations. Visibility configuration storage holds a set of visibility configuration values, each visibility configuration value associated with a thread of the multiple threads and the event handling circuitry adapts its use of the event information to restrict visibility of the event information for software of threads other than the thread which generated the event information when a visibility configuration value for the thread which generated the event information has a predetermined value. This allows multi-threaded event monitoring to be supported, whilst protecting event information from a particular thread for which it is desired to limit its visibility to software of other threads.

21 Claims, 8 Drawing Sheets

|  | COUNT EVENTS ON: | | | |
|---|---|---|---|---|
|  | PE0 | PE1 | PE2 | PE3 |
| PE0 | ✓ | ✓ | ✓ | ✓ |
| PE1 | ✓ | ✓ | ✓ | ✓ |
| PE2 | ✗ | ✗ | ✓ | ✗ |
| PE3 | ✗ | ✗ | ✗ | ✓ |
| MTD= | 0 | 0 | 1 | 1 |

COUNT EVENTS FROM:

FIG. 3B

|  | COUNT EVENTS ON: | | | |
|---|---|---|---|---|
|  | PE0 | PE1 | PE2 | PE3 |
| PE0 | ✓ | ✓ | ✗ | ✗ |
| PE1 | ✓ | ✓ | ✗ | ✗ |
| PE2 | ✗ | ✗ | ✓ | ✓ |
| PE3 | ✗ | ✗ | ✓ | ✓ |
| VMID= | 0x0 | 0x0 | 0x1 | 0x1 |

COUNT EVENTS FROM:

FIG. 3C

|  | COUNT EVENTS ON: | | | |
|---|---|---|---|---|
| COUNT EVENTS FROM: | PE0 | PE1 | PE2 | PE3 |
| PE0 | ✓ | ✓ | ✓ | ✓ |
| PE1 | ✓ | ✓ | ✓ | ✓ |
| PE2 | ✗ | ✗ | ✓ | ✓ |
| PE3 | ✗ | ✗ | ✓ | ✓ |
| VMID= | 0x0 | 0x0 | 0x1 | 0x1 |
| VMTD= | 0 | 0 | 1 | 1 |

FIG. 3D

|  | COUNT EVENTS ON: | | | |
|---|---|---|---|---|
| COUNT EVENTS FROM: | PE0 | PE1 | PE2 | PE3 |
| PE0 | ✓ | ✓ | ✓ | ✓ |
| PE1 | ✓ | ✓ | ✓ | ✓ |
| PE2 | ✗ | ✗ | ✓ | ✓ |
| PE3 | ✓ | ✗ | ✓ | ✓ |
| MTMASK: | x101 | 1x00 | 11x1 | 111x |

EVENT MONITORING IN A MULTI-THREADED DATA PROCESSING APPARATUS

This application claims priority to GB Patent Application No. 1505777.1 filed Apr. 2, 2015, the entire content of which is hereby incorporated by reference.

TECHNICAL FIELD

The present disclosure relates to a data processing apparatus. More particularly it relates to a data processing apparatus which can perform multi-threaded data processing operations.

BACKGROUND

It is known to provide a data processing apparatus which has the capability to perform multi-threaded data processing, according to which multiple threads of software are handled by the data processing circuitry of the multi-threaded data processing apparatus. The data processing apparatus then switches between the threads according to a defined scheme in order to make forward progress in the data processing operations defined by the instructions in each thread. For example this may involve a time-division multiplexing approach, and may also involve context switching from a first thread to a second thread when the first thread is held up, for example whilst waiting for data requested by a load operation to return from memory. Another approach is simultaneous multithreading, where the processor decides on each cycle, from the set of instructions available from all threads, which threads to execute and can therefore execute instructions from the same thread simultaneously. There are various known techniques for handling multiple threads in a data processing apparatus with which one of ordinary skill in the art will be familiar. It is further known to provide various types of monitoring capability within a data processing apparatus which can gather event information relating to the data processing operations which the data processing circuitry of the data processing apparatus is carrying out.

SUMMARY

Viewed from a first aspect the present techniques provide apparatus for multi-threaded data processing circuitry to perform data processing operations for each thread of multiple threads; event handling circuitry to receive event information from the data processing circuitry indicative of an event which has occurred during the data processing operations; and visibility configuration storage to hold a set of visibility configuration values, each visibility configuration value associated with a thread of the multiple threads, wherein the event handling circuitry is responsive on receipt of the event information to adapt its use of the event information to restrict visibility of the event information for software of threads other than the thread which generated the event information when a visibility configuration value for the thread which generated the event information has a predetermined value.

Viewed from a second aspect the present techniques provide a method of multi-threaded data processing comprising the steps of: performing data processing operations for each thread of multiple threads; storing a set of visibility configuration values, each visibility configuration value associated with a thread of the multiple threads; receiving event information indicative of an event which has occurred during the data processing operations; and adapting usage of the event information to restrict visibility of the event information for software of threads other than the thread which generated the event information when a visibility configuration value for the thread which generated the event information has a predetermined value.

Viewed from a third aspect the present techniques provide an apparatus for multi-threaded data processing comprising the steps of performing data processing operations for each thread of multiple threads; storing a set of visibility configuration values, each visibility configuration value associated with a thread of the multiple threads; receiving event information indicative of an event which has occurred during the data processing operations; and adapting usage of the event information to restrict visibility of the event information for software of threads other than the thread which generated the event information when a visibility configuration value for the thread which generated the event information has a predetermined value.

Viewed from a fourth aspect the present techniques provide a computer readable storage medium storing in a non-transient form software which when executed on a computing device causes the computing device to carry out the method of the second aspect.

Viewed from a fifth aspect the present techniques provide software which when executed on a computing device causes the computing device to carry out the method of the second aspect.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

At least some embodiments provide an apparatus for multi-threaded data processing comprising data processing circuitry to perform data processing operations for each thread of multiple threads; event handling circuitry to receive event information from the data processing circuitry indicative of an event which has occurred during the data processing operations; and visibility configuration storage to hold a set of visibility configuration values, each visibility configuration value associated with a thread of the multiple threads, wherein the event handling circuitry is responsive on receipt of the event information to adapt its use of the event information to restrict visibility of the event information for software of threads other than the thread which generated the event information when a visibility configuration value for the thread which generated the event information has a predetermined value.

Event handling circuitry which receives event information from data processing circuitry in order to gather information with respect to the data processing operations of that data processing circuitry has been recognised by the present techniques to present a potential security vulnerability in the context of a multi-threaded data processing apparatus. For example, the multiple threads being executed by the data processing circuitry may be being run on different operating systems supported by the data processing apparatus for which it is desirable that event information originating in one operating system is not visible to the other operating system. One example of this is where one thread being executed in one operating system is carrying out data processing relating to data for which it is desired to provide protection, such as private keys in a cryptographic context or particular data content (e.g. personal data) which requires careful protection. Although the event information may only relate to events occurring during the data processing operations carried out for each thread which do not appear to have a security implication, such as cache misses, the present techniques recognise that even such simple hardware based information could in some ways jeopardise the desired security being maintained with respect to the thread carrying out the data processing operations on the data which is to be carefully protected.

The present techniques both recognise and address this problem by providing visibility configuration storage (for example, in the form of a system control register) which holds a set of visibility configuration values, each visibility configuration value associated with one of the threads of the multiple threads. If the visibility configuration value held for a given thread takes a particular (pre-determined) value indicating that the visibility of event information should be restricted, the event handling circuitry which receives the event information from the data processing circuitry related to the data processing operation which it is carrying out can then take steps to ensure that the visibility of event information related to the execution of that thread is restricted for the software of other threads than the thread which generated the event information. The thread which generated the event information, and in particular the data which it handles, is thus better protected. The restriction on the visibility of the event information may take a number of forms in different embodiments (as is detailed below), for example this restriction may be absolute, so that strictly only software of the thread which generated the event information has visibility of it, or it may be slightly more permissive in that software of some other threads, which are deemed to be trusted in association with the thread which generated the event information, are also allowed visibility of the event information.

In some embodiments, not only is visibility of the event information restricted for software of threads other than the thread which generated the event information (in dependence on the corresponding visibility configuration value) but also each visibility configuration value is not accessible to software of threads other than the corresponding thread. This provides a further level of protection for that corresponding thread, in that software of other threads not only can be prevented from seeing event information relating to that thread, but they can also be prevented from even knowing what the visibility configuration value held for that thread is, and certainly cannot modify it.

The event handling circuitry may take a variety of forms, but in some embodiments the event handling circuitry comprises at least one event counter. On the basis of the event information received from the data processing circuitry the at least one event counter can therefore accumulate a total count of the number of events of a particular predetermined kind which are determined to have occurred on the basis of that received event information.

Where the event handling circuitry comprises at least one event counter the number of event counters may vary, but in some embodiments the at least one event counter comprises an event counter for each thread of the multiple threads. Accordingly, a corresponding accumulated event count can be kept for each of the multiple threads.

Whilst each event counter could be configured only to count events for a single corresponding thread, in some embodiments the at least one event counter is configurable for multi-thread event counting and the at least one event counter counts events for more than one thread. Thus this multi-thread counting event counter may be configured in a range of ways for event counting, from only counting for a small subset of the multiple threads, through to event counting for all of the multiple threads being executed by a data processing circuitry. This is however subject to the additional constraint according to the present techniques that a thread being executed by the data processing circuitry which generates event information received by the event counter can be excluded from this multi-thread event counting configured event counter, by virtue of setting its corresponding visibility configuration value to the predetermined value, and in response to this the event handling circuitry does not allow event information from that thread to be registered as a count in the multi-thread event counting counter.

Thus, in some embodiments responsive to the at least one event counter performing multi-thread event counting the at least one event counter does not count events for the thread which generated the event information when a visibility configuration for the thread has the predetermined value.

The set of visibility configuration values held by the visibility configuration storage may take a variety of forms, but in some embodiments the visibility configuration storage is arranged to hold single bit configuration visibility configuration values. For example, a single bit visibility configuration value may be held by the visibility configuration storage for each thread of the multiple threads that are handled by the data processing circuitry. Thus, each thread can have its event information visibility for software of other threads defined by its own corresponding single bit configuration visibility value.

In some embodiments, the visibility configuration storage is arranged to hold multi-bit visibility configuration values, wherein the event handling circuitry is responsive on receipt of the event information to adapt its use of the event information such that visibility of the event information for software of each of the multiple threads other than the thread which generated the event information is defined by a corresponding bit of a multi-bit visibility configuration value stored for the thread which generated the event information. These multi-bit visibility configuration values held by the visibility configuration storage could take a range of forms, but in some embodiments a multi-bit visibility configuration value is held by the visibility configuration storage for each thread of the multiple threads. The multi-bit visibility configuration value held for each thread can thus define whether the event information generated by that thread is visible to software on each of the other multiple threads individually.

There may be groupings of threads (for example having a logical, security or other connection with one another), within which it is considered acceptable to share event information and in some embodiments the thread which generated the event information is comprised in a group of threads, and the event handling circuitry is responsive on receipt of the event information to adapt its use of the event information such that the event information is visible to software of threads in the group of threads and such that the event information is not visible to software of threads not comprised in the group of threads. Thus threads within the group have mutual event information visibility within the group and threads outside the group have no visibility of event information within the group.

In some embodiments the group of threads is defined by a group identifier, and the event handling circuitry is responsive on receipt of the event information to use the group identifier as the visibility configuration value. In other words, restriction of the visibility of the event information for software of threads other than the thread which generated the event information may be determined by the group identifier itself, which characterises the group of threads as a group.

In other embodiments a group visibility configuration value for the group of threads may be defined and in such embodiments the thread which generated the event information is comprised in a group of threads, and the visibility configuration value is given by a group visibility configuration value for the group of threads.

In some embodiments the event handling circuitry may impose a strict "generating thread only" visibility rule, wherein (when the visibility configuration value for the thread which generated the event information has the predetermined value) the only software which is allowed visibility of the event information is the thread which generated it, and in such embodiments the event handling circuitry is responsive on receipt of the event information to adapt its use of the event information such that the event information is not visible to software of threads other than the thread which generated the event information when the visibility configuration value for the thread which generated the event information has the predetermined value.

The multiple threads may be grouped together into at least one group of threads for which a visibility configuration value is defined for the group as a whole and thus in some embodiments at least one visibility configuration value corresponds to a group of threads of the multiple threads, and the event handling circuitry is responsive on receipt of the event information to adapt its use of the event information such that the event information is not visible to software of threads other than threads in the group of threads which includes the thread which generated the event information when the visibility configuration value for the group of threads including the thread which generated the event information has the predetermined value.

The grouping of threads in this manner may correspond to a range of different logical, security-based, or other chosen groupings, for example in some embodiments the group of threads may be defined to correspond to a given virtual machine identifier being used within the apparatus, where the data processing circuitry is capable of supporting multiple virtual machines which are each identified by such a virtual machine identifier. Where threads are defined to belong to the same virtual machine identifier grouping then they will have visibility of each others' event information.

In some embodiments the data processing circuitry is arranged to perform data processing operations for each thread of multiple threads at a selected execution level of multiple execution levels, wherein each visibility configuration value is not accessible to threads being executed at a lower execution level than the selected execution level. The multiple execution levels thus can be arranged as a privilege hierarchy, according to which higher execution levels have access to the visibility configuration values of lower execution levels but not vice versa.

Indeed in some embodiments each visibility configuration value is not accessible to software of threads being executed at a same execution level as the selected execution level. This may be made use of in particular at the lower end of the privilege hierarchy of execution levels, such that software of threads being executed at lower execution levels can only access their own visibility configuration value.

The multiple execution levels may take a variety of forms, but in some embodiments the multiple execution levels comprise multiple exception levels. In some embodiments the multiple execution levels comprise multiple security levels. Maintenance of the integrity of the privilege hierarchy, whatever particular form it takes, is thus supported by the present techniques in such embodiments.

Whatever form the execution levels may take, in some embodiments the apparatus is arranged to update the visibility configuration value when context switching between execution levels. This also helps to maintain the integrity of the privilege hierarchy when the apparatus context switches.

In some embodiments the data processing circuitry is arranged to perform the data processing operations in response to instructions and to select a subset of the instructions which it executes for profiling, the profiling being on the basis of event information generated for the subset of instructions, wherein the profiling comprises storing to a storage unit profiling data comprising the event information or further information derived from the event information, and wherein the data processing circuitry is arranged to prevent storage of the profiling data when the visibility configuration value for the thread which generated the event information has the predetermined value. The ability to perform profiling for a subset of instructions may thus be supported, whilst still protecting the thread which generated the event information (by setting the visibility configuration value to the predetermined value), since profiling data on the basis of the event information received (for the thread being protected) will not be stored to the storage unit. The manner in which storage of the profiling data is prevented may vary, for example it may comprise excluding instructions from the subset on the basis of the visibility configuration value. It may comprise steps being taken to prevent particular event information (or further information derived from the event information) from being stored as profiling data to the storage unit.

At least some embodiments provide a data processing system comprising the apparatus as set out in any of the above described embodiments and a storage unit.

At least some embodiments provide a method of multi-threaded data processing comprising the steps of performing data processing operations for each thread of multiple threads; storing a set of visibility configuration values, each visibility configuration value associated with a thread of the multiple threads; receiving event information indicative of an event which has occurred during the data processing operations; and adapting usage of the event information to restrict visibility of the event information for software of threads other than the thread which generated the event information when a visibility configuration value for the thread which generated the event information has a predetermined value.

At least some embodiments provide an apparatus for multi-threaded data processing comprising means for performing data processing operations for each thread of multiple threads; means for storing a set of visibility configuration values, each visibility configuration value associated with a thread of the multiple threads; means for receiving event information from the means for performing data processing operations indicative of an event which has occurred during the data processing operations; and means for adapting usage of the event information to restrict visibility of the event information for software of threads other than the thread which generated the event information when a visibility configuration value for the thread which generated the event information has a predetermined value.

At least some embodiments provide a computer readable storage medium storing in a non-transient form software which when executed on a computing device causes the computing device to carry out the above mentioned method.

At least some embodiments provide software which when executed on a computing device causes the computing device to carry out the above mentioned method.

Figure 1:
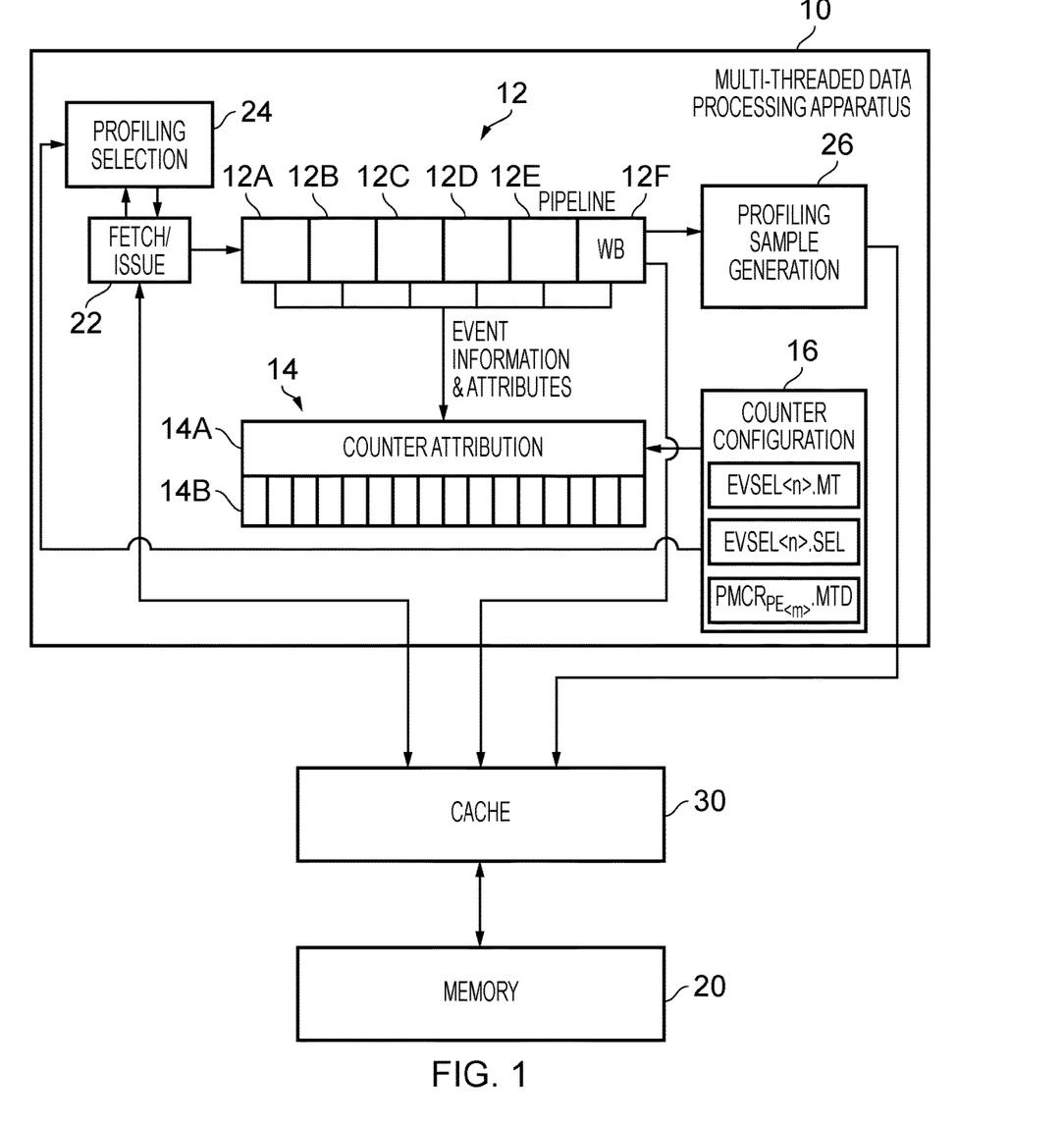
FIG. 1 schematically illustrates an apparatus for multi-threaded data processing in one embodiment.

FIG. 1 schematically illustrates a multi-threaded data processing apparatus in one embodiment. This multi-threaded data processing apparatus 10 has an overall configuration according to which its data processing circuitry performs data processing operations on the basis of data processing instructions. In the example of FIG. 1, the data processing circuitry is represented by the execution pipeline 12, for which a fetch/issue unit 22 is provided to retrieve a sequence of data processing instructions from memory 20 and to issue these appropriately into the execution pipeline 12, in a manner in which one of ordinary skill in the art will be familiar. Furthermore, the execution pipeline 12 comprises a final writeback (WB) stage 12F which causes the result of the data processing operations to be written back to the memory 20, also in a manner in which ordinary skilled in the art will be familiar. The data processing apparatus 10 is not only capable of executing a single thread of data processing instructions, but is configured as a multi-threaded data processing apparatus, such that multiple threads of data processing instructions can be concurrently handled by the data processing apparatus 10, and the fetch/issue unit 22 is configured to administer the retrieval and issuance of the instructions for each of these respective multiple threads, and to appropriately issue a next data processing instruction into the execution pipeline 12 for one of these threads. One of ordinary skill in the art will be familiar with the various ways in which a multi-threaded data processing apparatus can handle and switch between its multiple threads, and further detailed description of this aspect of the operation of the data processing apparatus is omitted here for brevity.

As a data processing instruction progresses through the execution pipeline 12, the response of the execution pipeline stages (12A-F) may result in event information being generated which is passed to the set of counters 14. There is no particular constraint here on the nature that this event information may take, and it may relate to any aspect of the operation of the execution pipeline 12, of the data processing apparatus 10, or indeed to an indication received by the data processing apparatus 10 relating to a component of the wider data processing system (of which the data processing apparatus 10 forms part, for example including the memory 20 and the cache 30 in the example of FIG. 1).

One manner in which the event information is used in the example of FIG. 1 is by the provision of the set of counters 14 in association with the execution pipeline 12. Event information indications are received from the execution pipeline 12 by the counters 14, together with further attribute information associated therewith (for example an indication of the thread which caused the generation of that event information). The counters 14 comprise a set of counter attribution circuitry 14A together with multiple individual counters 14B, which in the example of FIG. 1 comprise 16 separate individual counters. On the basis of the event information and associated attributes received, the counter attributions can cause at least one of the individual counters 14B to increment its count. Further detail of the operation of the counter attribution circuitry 14A is given below with reference to FIGS. 4 and 5. The particular manner in which the counter attribution circuitry 14A will operate is defined by the counter configuration unit 16, which in the example of FIG. 1 takes the form of system control registers, and in accordance with the present techniques these can hold the illustrated values EVSEL<n>.MT, EVSEL<n>.SEL and $PMCR_{PE<m>}$.MTD the use of which will be described below with reference to FIG. 4. Central to the present techniques is the value MTD (a "visibility configuration value") for each thread, the use of which will be described below with reference to FIGS. 2A-C. PMC refers to the Performance Monitoring unit event Counter and this is stored in the PMCR, which is the Performance Monitoring unit event Counter Register.

A further aspect of the configuration of the data processing apparatus 10 in FIG. 1 is provided by the profiling selection circuitry 24 and the profiling sample generation circuitry 26. In order to gather profiling information relating to the operation of the data processing apparatus, in particular with a regard to the manner in which particular instructions are handled by the data processing apparatus 10, the profiling selection circuitry 12 monitors the instructions being retrieved from memory by the fetch/issue unit 22 and has a configuration to cause selected instructions of those instructions to be tagged for profiling as they pass through the execution pipeline 12. The profiling sample generation circuitry 26, for the tagged instructions which have been selected for profiling by the profiling selection circuitry 24, generates profiling data which it then causes to be stored in memory 20 for later analysis. In order to determine which instructions should be selected for profiling, the profiling selection circuitry 24 also has access to the system control registers, and in accordance with the present techniques in particular the system control register holding the $PMCR_{PE<m>}$.MTD, the setting of this value for a particular thread n causing instructions of that thread be opted out of the profiling.

Figure 2A:
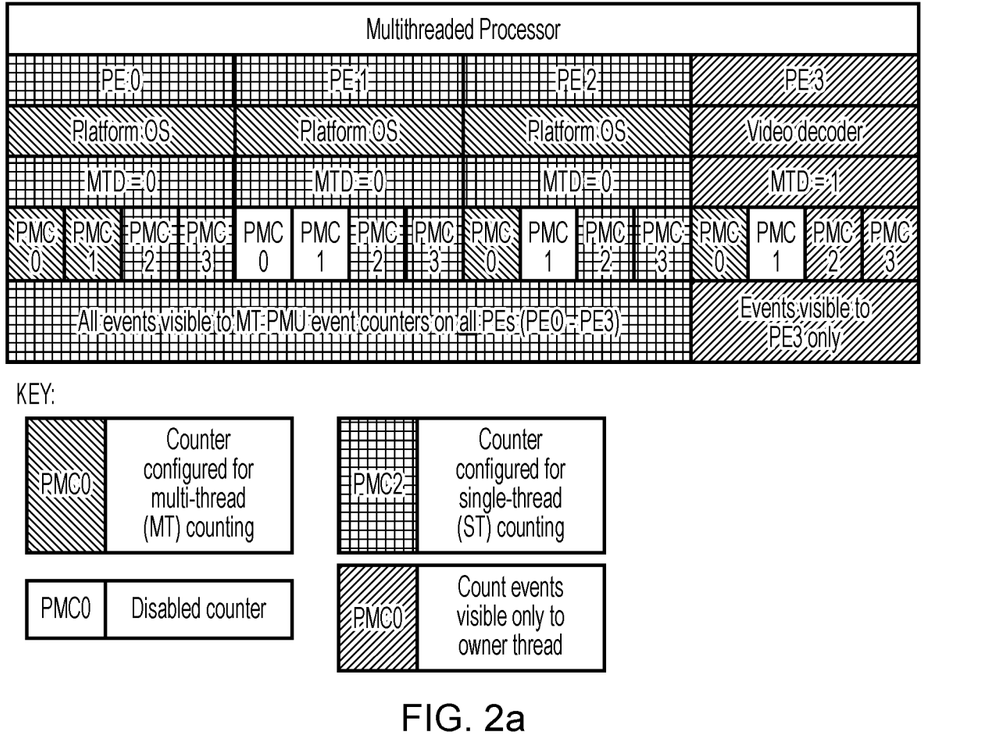
FIGS. 2A, 2B and 2C show different examples of the use of visibility configuration values to control the visibility of event counts between different threads being executed by a multi-threaded data processing apparatus in some embodiments.
Figure 2B:
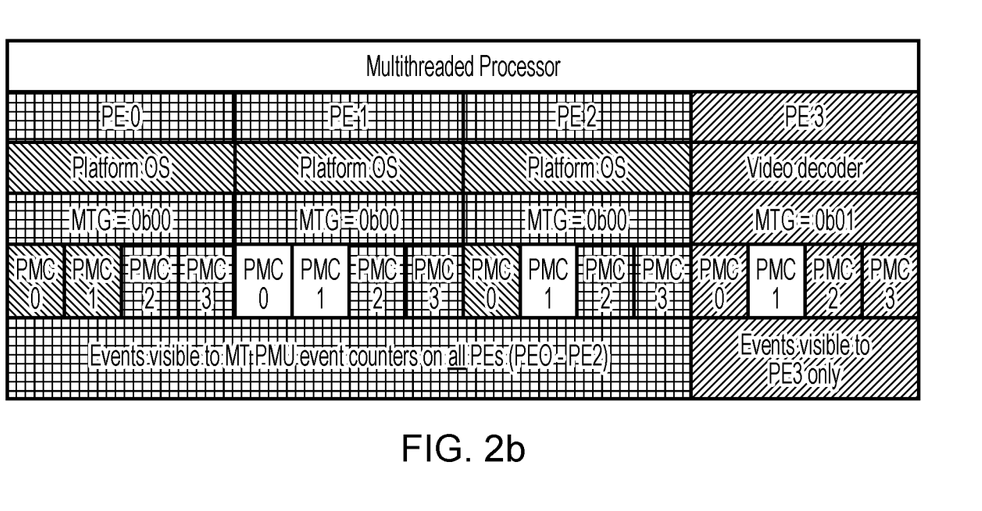
Figure 2C:
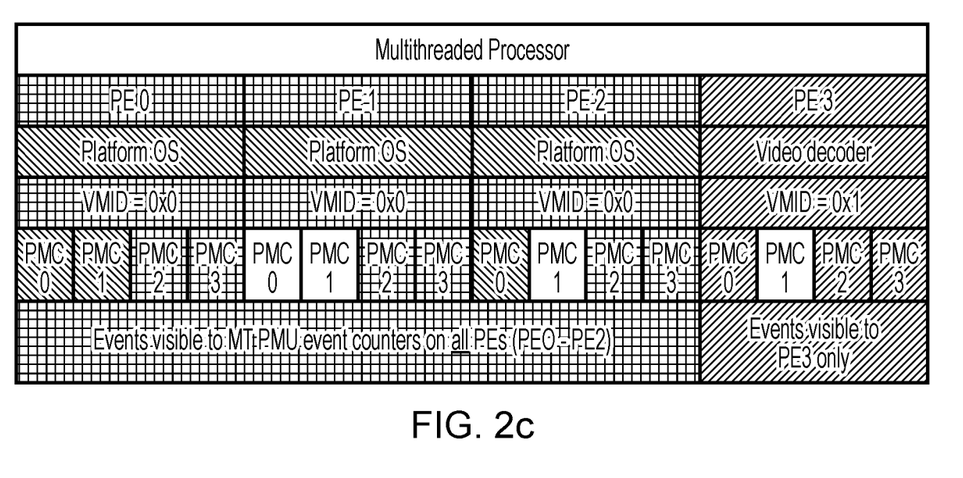

FIGS. 2A-2C give an overview of how a set of sixteen individual counters (such as the sixteen counters 14B in the multi-threaded data processing apparatus 10 of FIG. 1) may be configured to count events occurring within the multi-threaded processing system, in which four threads are being handled. As labelled in FIGS. 2A-2C, these four (hardware) threads are represented by PE (processing element) 0-3. As can also be seen in the examples of FIG. 2A-C, threads PE 0-2 are running a platform operating system ("Platform OS"), whilst the thread PE 3 is running a dedicated video decoder.

As can be seen in FIGS. 2A-2C, each thread (PE) is allocated four counters. In the example shown in FIG. 2A two of the counters allocated to each PE are configured for single-thread (ST) counting. These are labelled PMC 2 and PMC 3. Conversely, various counters have been configured for multi-thread (MT) counting, namely: PMC 0 and PMC 1 for PE 0; PMC 0 for PE 2; and PMC0 for PE 3. The unshaded counters (PMC 0 and PMC 1 for PE 1, and PMC 1 for PE 2 and PE 3) are disabled. In the example of FIG. 2A, the control bit MTD has been set for PE 3 to be 1, whilst it has been set for PE 0-2 to be 0. This "opts out" PE 3 (i.e. the thread executing the video decoder) from the multi-threaded view of the other threads (i.e. those executing the platform OS). Where this control bit is clear (i.e. zero) for PE 0-2, the data processing operations of each of those threads is visible to the other MT threads in the current MT cluster (i.e. PE 0-2). When the operating setup shown in FIG. 2A is implemented by the data processing apparatus by providing one virtual machine (VM) for the platform OS and another for the video decoder, when the hypervisor of the system context switches between these VMs the control bit is updated by the hypervisor along with the state of the guest operating system, so that information from a more secure VM (i.e. the video decoder) can be hidden from the other virtual machine (i.e. the operating system).

Thus, in the example shown in FIG. 2A, the counters configured as MT and allocated to any PE can be used to monitor (i.e. count) the platform OS events (in the figure diagonally hatched top left to bottom right), i.e. events attributable to PE 0-2. PE 3 is running a dedicated video decoder (in the figure diagonally hatched bottom left to top right) which the hypervisor has determined should be protected, and its operation hidden from the platform OS. Hence the control bit MTD has been set for this PE, such that the video decoder events, i.e. events attributable to PE 3, are visible to PE 3 only, and so are never counted by the counters allocated to PE 0-2. Accordingly, by this use of the MTD control bit for each processing element, multi-threaded event counting can be supported whilst maintaining the security required between the threads being executed.

FIG. 2B shows a variation on the configuration of FIG. 2A, in particular where a 2-bit control value (labelled in this example as MTG) is used to group the PEs together so that multi-threaded (MT) counting can occur amongst PEs which are allocated to the same group. In the example of FIG. 2B, the MTG control value is a two-bit value and is set for the respective PEs such that PE 0-2 form one group (MTG=0b00), whilst PE 3 forms its own "group" (MTG=0b01). The particular effect of this grouping with regard to the visibility of events attributable to PE 0-2 (compared to the example of FIG. 2A) is that events attributable to PE 0-2 are now no longer visible to PE 3. This is due to the fact that PE 3 forms its own "group" (by being the only PE having the MTG value 0b01).

A similar result is produced by the alternative shown in FIG. 2C, in which instead of the grouping of the PEs being provided by the setting of the MTG value of FIG. 2B, in FIG. 2C this is provided by reference to the VMID values, i.e. identifier values attributed to different virtual machines (VMs) which are provided in this multi-threaded processor. In the example of FIG. 2C PEs 0-2 belong to VM0 (VMID=0x0), whilst PE 3 belongs to VM1 (VMID=0x1).

Figure 3A:
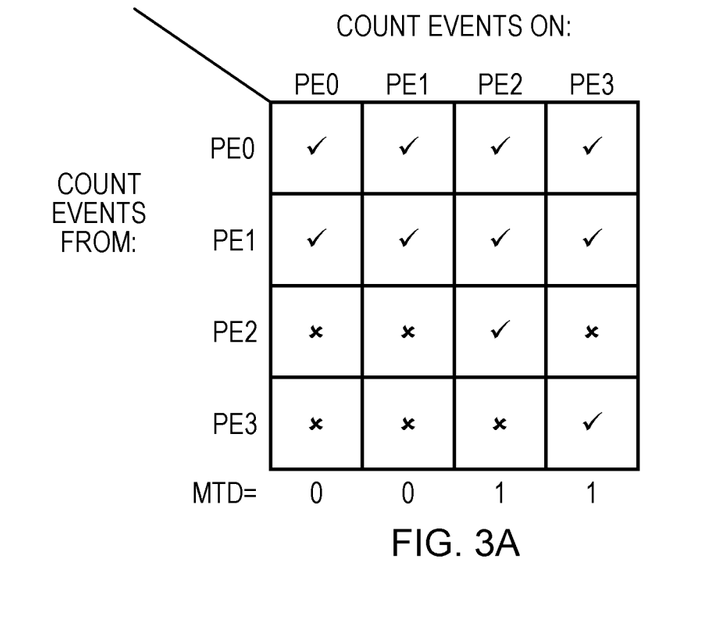
FIGS. 3A, 3B, 3C and 3D show four different types of visibility configuration values and example values thereof leading to different styles of event counting between the four threads being executed in some embodiments.

FIGS. 3A-3D show different examples of control values being used to configure the manner in which events occurring for a set of four PEs are counted on four counters respectively attributed to those four PEs. In the example of FIG. 3A, the control bit MTD is clear (0) for PE0 and PE1 whilst it is set (1) for PE 2 and PE 3. This has the effect that, and noting that all counters in this example are configured for multi-threaded (MT) counting, the counters allocated to any PE will count events from PE 0 and PE 1, but events from PE 2 are only counted by a counter allocated to PE 2 and similarly events from PE 3 are only counted on a counter allocated to PE 3.

Figure 3B:
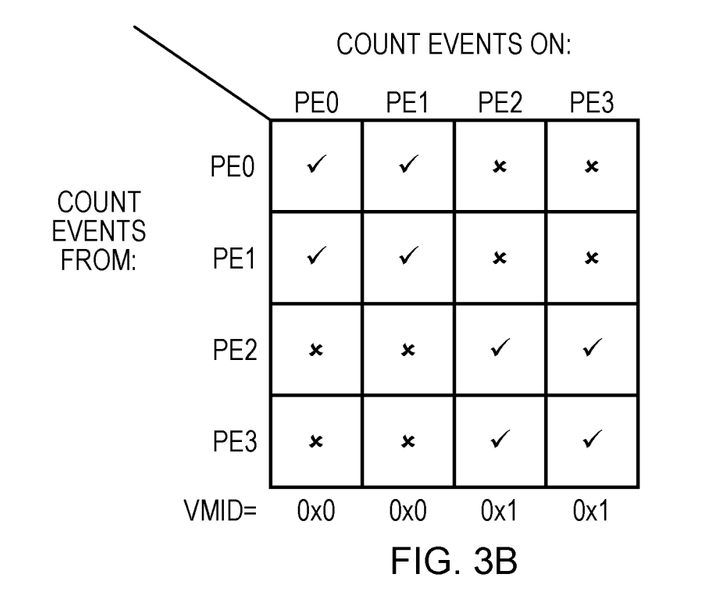

In the example of FIG. 3B, grouping of the PEs for the purpose of event counting and event counting visibility, is achieved with reference to the above-mentioned VMID values. As can be seen in FIG. 3B, PE 0 and PE 1 belong to VMID 0, whilst PE 2 and PE3 belong to VMID 1. As a result, and again bearing in mind that all counters in this example are configured for MT operation, a configuration is provided in which counts from PEs in a VMID group are only counted on counters attributed to that VMID group, and the resulting counts are then visible only to PEs within that VMID group. Thus, in the example shown in FIG. 3B it can be seen that for VMID group 0 counts of events from PE 0 and PE 1 are made on counters allocated to PE 0 and PE 1 (only), whilst events from PE 2 and PE 3 are counted (only) on counters allocated to PE 2 and PE 3. There is no cross-counting between the two VMID groups.

Figure 3C:
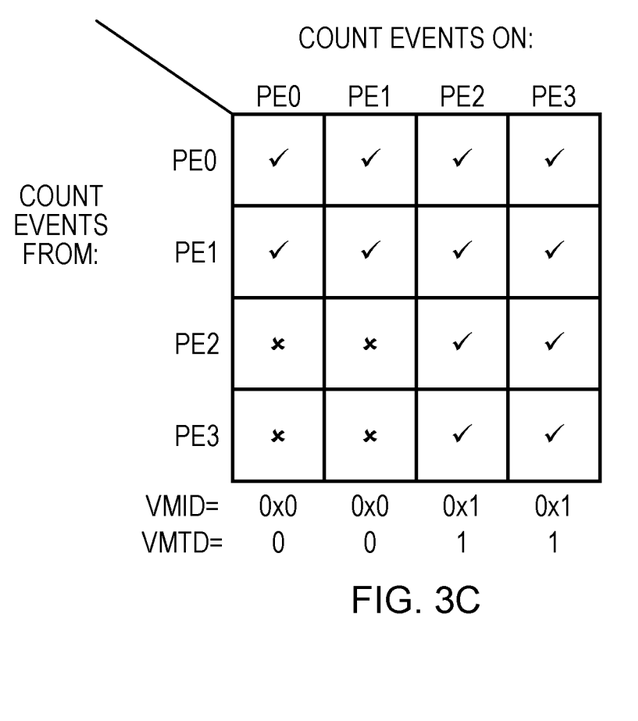

FIG. 3C shows a variant on the embodiment of FIG. 3B, again using the virtual machine identifier VMID, but in addition using an associated group control bit (VMTD) to further define the visibility of event counts between the two groups. In this example, PE 0 and PE 1 belong to a first virtual machine (VMID=0) and PE 2 and PE 3 belong to a second virtual machine (VMID=1) and correspondingly the value of VMTD set for PE 0 and PE 1 is 0 and the value of VMTD set for PE 2 and PE 3 is 1. As can be seen in FIG. 6, this has the effect, compared to the example of FIG. 3B, that additionally events from PE 0 and PE 1 are counted on counters allocated to PE 2 and PE 3.

Figure 3D:
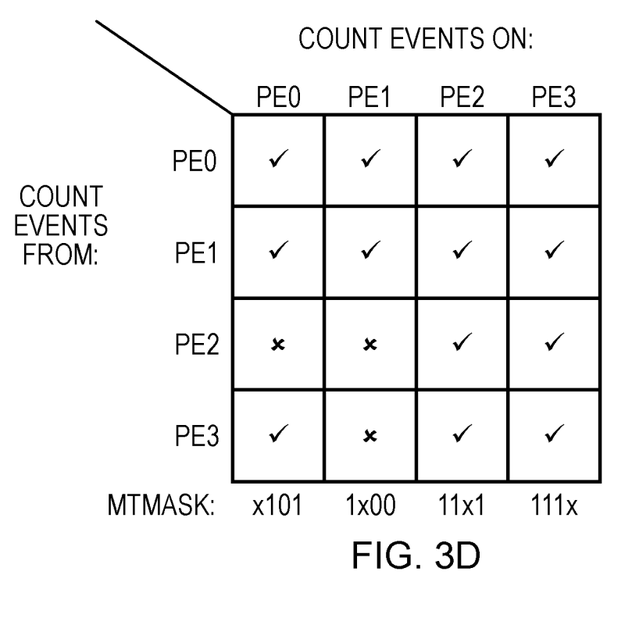

Finally, FIG. 3D shows an example in which the visibility of event counts between threads is controlled by a use of a mask value (MTMASK) stored for each thread. The MTMASK value stored for each thread is shown at the bottom of FIG. 3D corresponding to the "count events on" column for the corresponding thread. The MTMASK values are shown in a little endian format with respect to the thread numbering and it can therefore be seen that no explicit value is stored for the thread itself (and the value is instead indicated in the figure by "x", which is effectively treated as a set value of "1"). The effect of setting up these mask values with the bit patterns shown in FIG. 3D is that events from PE 0 and PE 1 are counted on all counters, whilst events from PE 2 are only counted on counters allocated to PE 2 and PE 3. The counters for PE 2 and PE 3 count events for themselves and for each other, and in addition events from PE 3 are counted on a counter allocated to PE 0.

Figure 4:
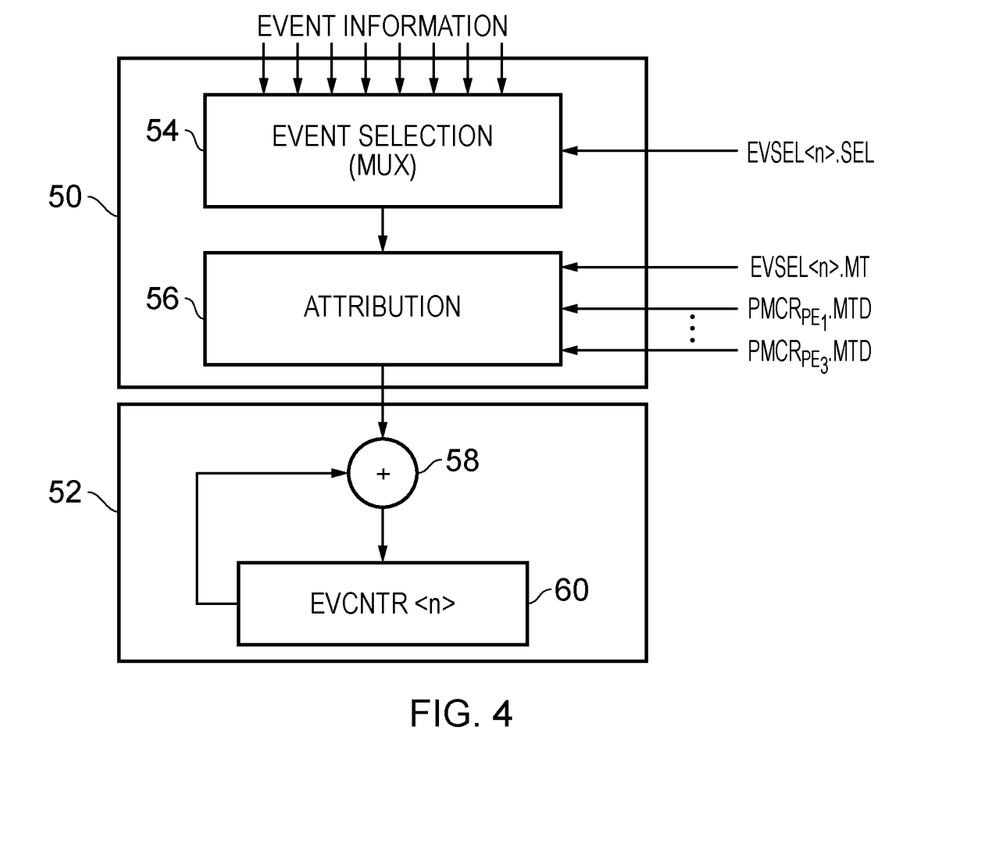
FIG. 4 schematically illustrates the reception of event information by event handling circuitry in one embodiment and its configuration to gather event count information on the basis of the received event information and visibility configuration values.

FIG. 4 shows an example of how the counter circuitry of 14 of FIG. 1 is configured in one embodiment. Thus, in FIG. 4 the counter attribution circuitry (14A in FIG. 1) is shown by reference 50, whilst an example counter (14B in FIG. 1) is shown by reference 52. The counter attribution circuitry 50 comprises event selection circuitry (essentially a multiplexer) 54 and attribution circuitry 56. The counter 52 comprises an adder 58 and a value storage 60 attributed to this particular counter (label "n"). The event selection multiplexer 54 is steered on the basis of the control value EVSEL<n>.SEL which it receives from the counter configuration unit (16 in the example of FIG. 1). Here "n"

corresponds to the particular counter under consideration and thus the EVSEL<n>.SEL value selects one of the received events for the counter <n>. In the illustrated example (where the event selection multiplexer is shown receiving event information from 8 different sources) EVSEL<n>.SEL is a 3-bit selecting value, allowing the selection of one of the eight events. The selected event information (a single bit indicating that an event for which a count may be recorded has been observed) is passed to the attribution circuitry 56. The attribution circuitry 56 will pass an event count signal for the thread to which a given counter is allocated (as indicated by the attribute value received with that information that event information) on to the event counter 52 without further filtering. However, the attribution circuitry 56 also receives a bit value MT of the EVSEL<n> value indicating whether counter n is currently configured for multi-thread counting. Thus, for event counts received that are attributed to a different thread, the attribution circuitry 56 also determines if the counter is permitted accumulate this count value. If the event counter is configured for multi-thread counting then the attribution circuitry 56 further determines if the MTD bit (given by $PMCR_{PE<thread>}$.MTD) corresponding to the thread indicated by the attribute information received is set. If this value is set, then this indicates that the thread which generated this event information has been configured to be "opted out" of the multi-thread view of other threads and the attribution circuitry 56 does not pass the indication of the event occurring on to any counter 52 which is not allocated to that thread. However, if the MTD bit is not set for the thread which owns this event information then the attribution circuitry 56 does pass the event (count) indication on to other event counters 52 which are allocated to other threads (and are configured (by the setting of their MT bit) for multi-thread counting). An individual counter 52 then adds (using its adder 58) the indication of the event occurrence to its currently stored (in storage 60) value for the number of counts seen by this counter for thread n.

Figure 5:
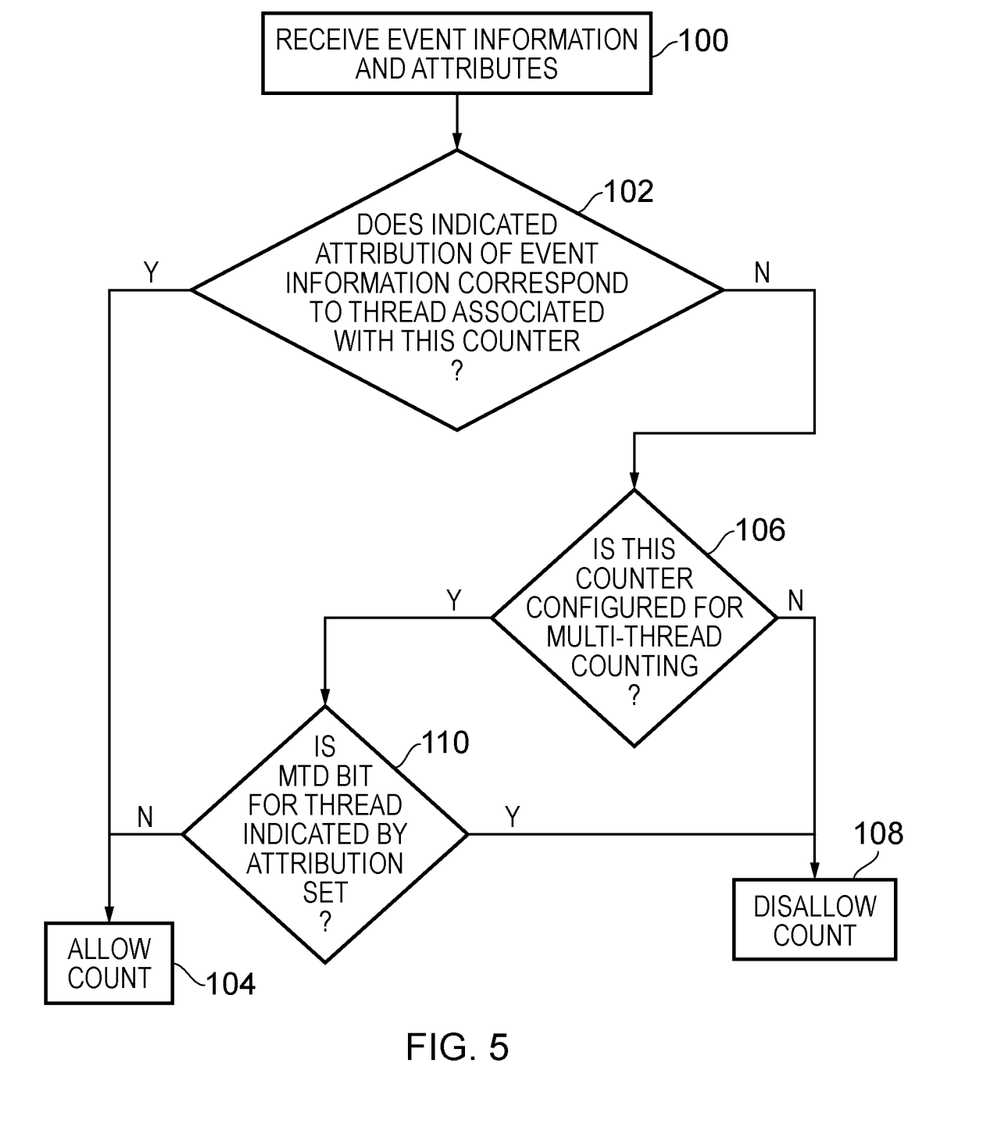
FIG. 5 is a flow diagram illustrating a sequence of steps which are taken when carrying out the method of one embodiment to determine if a particular counter should count events derived from event information.

FIG. 5 shows a flow diagram indicating a sequence of steps which are taken in one embodiment to determine if received event information and attributes should result in an incremented count for a particular counter. New event information and attributes (which may for example simply be a set bit indicating the occurrence of a particular event and an indication of the owning thread) are received at step 100. Then at step 102 it is determined if the indicated attribution of the event information (i.e. the owning thread) correspond to the thread to which the particular counter under consideration is allocated. If it does, then the flow proceeds directly to step 104 where this event is allowed to increment this counter (NB assuming this counter is currently enabled). If however at step 102 it is determined that the event information corresponds to a thread not associated with this counter, then the flow proceeds to step 106 where it is determined if the counter under consideration is currently configured for multi-threaded counting. If it is not, then the flow proceeds to step 108 and the corresponding counter is not allowed to increment. If however this counter is configured for multi-thread counting then the flow proceeds to step 110 where it is determined if the MTD bit is currently set for the thread indicated by the attribution information associated with this event indication. If this MTD bit is set then the flow also proceeds to step 108 and the counter is not allowed to increment. If however at step 110 it is found that the MTD bit is not set then the flow proceeds to step 104 where the increment of the relevant counter is allowed (assuming that the counter is currently enabled).

Figure 6A:
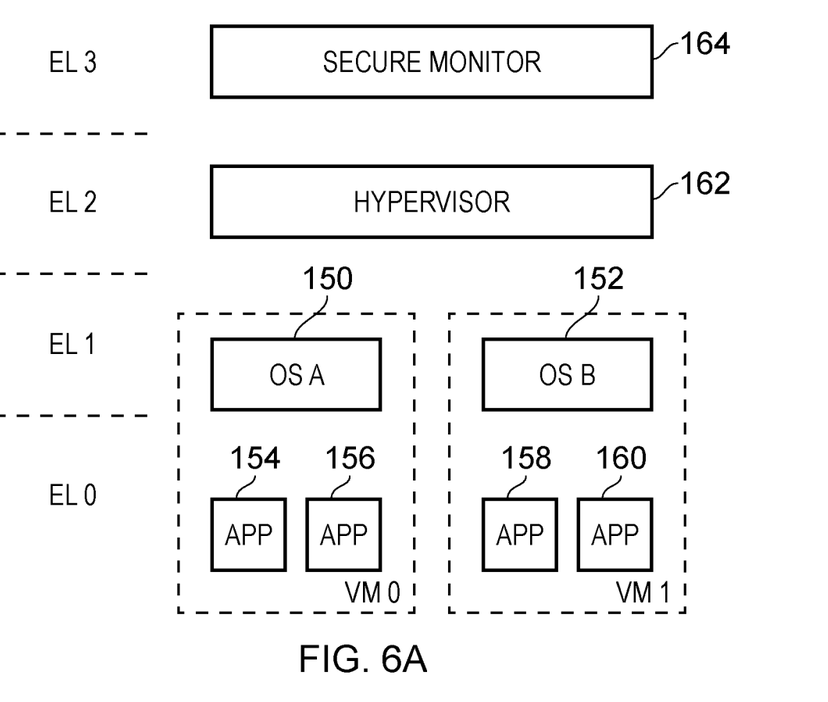
FIG. 6A schematically illustrates four execution levels (privilege levels) which are implemented in the apparatus of one embodiment.

As described above, some embodiments may make use of a virtual machine identifier (VMID) in place of, or in addition to, the control bit MTD and FIG. 6A schematically illustrates the logical internal configuration of data processing apparatus supporting multiple virtual machines. Thus, FIG. 6A schematically illustrates an embodiment in which a virtualised operating environment is provided. Two guest operating systems OS A 150 and OS B 152 are shown (but more may be supported, but are not illustrated here for clarity) under the control of which respective applications 154, 156, 158, 160 are executed. Overall control of these guest operating systems and the applications they execute is maintained by a hypervisor 162 which further maintains overall control of the virtualised operating environment and dictates what a particular virtual machine (i.e. guest operating system and the applications it is running) can see and interact with in the system. In the example shown in FIG. 6A, guest operating system OS A 150 and the applications which it runs represent a first virtual machine (VM0) and the second guest operating system OS B 152 and the applications which it runs can be considered to be a second virtual machine (VM1). FIG. 6A also schematically illustrates the fact that different components of the system shown operate at different "exception levels" (EL0-3), which essentially represent different levels of privilege within the system and correspond to the level of control and visibility of other components of the system that a given component has. Thus, a privilege hierarchy is supported with the applications 154-160 operating at the lowest level of that hierarchy, the guest operating systems 150 and 152 operating at a next higher level of that hierarchy, and the hypervisor 160 operating at still higher level. Note also that in FIG. 6A a further higher level of this privilege hierarchy is shown, namely the secure monitor 164, which operates at the highest level of privilege supported in the system in order to maintain strict control over the sub-division of the system into a "secure world" and a "non-secure world" to provide a reliable security division between trusted applications/operating systems which may handle security-sensitive data and other applications/operating systems to which such trust is not afforded. This is discussed below with reference to FIG. 6B. With particular reference to the present techniques, a given PE (thread) which is executed in order to run one of the applications 154-160 will, as described above, have a particular value of a control bit set (which may be a dedicated control bit such as MTD stored in a system control register, or may be represented by the virtual machine identifier VMID (held by the system to identify virtual machines VM0 and VM1), or any of the other variants thereon discussed above). The hypervisor 162 is responsible for context switching between the virtual machines and thus when such a context switch is carried out and the state of one guest OS (and more generally virtual machine) is replaced by another, the hypervisor 162 is also responsible for appropriately switching the relevant control bit (whether embodied as a single per-thread bit, or as a group bit, or as a mask value in accordance with the embodiments described above) such that the desired control over the visibility between threads is maintained. In particular, this ensures that event information (e.g. count values) for a more trusted (secure) virtual machine can be hidden from a less trusted virtual machine.

Figure 6B:
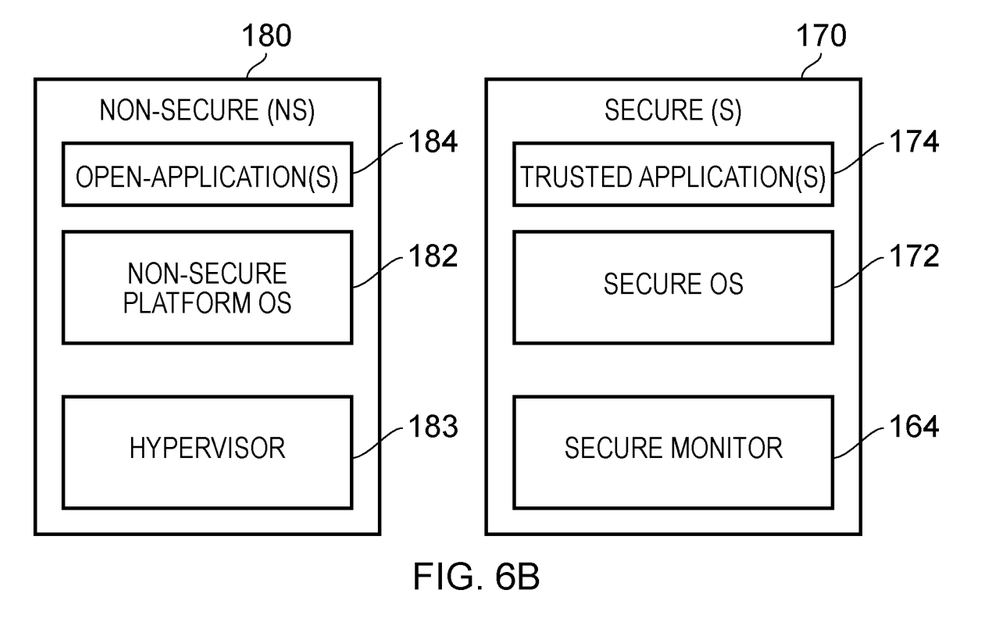
FIG. 6B schematically illustrates the subdivision of an apparatus into a non-secure world and a secure world in one embodiment.

FIG. 6B schematically illustrates the sub-division of the data processing system into the above-mentioned secure (S)

and non-secure (NS) worlds. This may be implemented by the use of the TrustZone technology provided by ARM Limited of Cambridge, UK. Control of this sub-division and the transition between the secure and non-secure worlds is maintained by the secure monitor 164, which therefore itself forms part of the secure world 170, and in terms of the privilege hierarchy shown in FIG. 6A operates at the highest level thereof. Also comprised within the secure world 170 are any guest operating systems which are trusted to operate within this space, e.g. secure operating system 172, as well as at least one trusted application 174. The non-secure world 180 comprises the non-secure platform operating system 182, the hypervisor 183, and at least one open application 184. Hence, the division of the system into a secure world 170 and the non-secure world 180 thus represents another example of a sub-division of the system into parts for which event information on one side may require restricting in terms of its visibility for components on the other side. As such, as part of the control which the secure monitor 164 exerts over the system as a whole, it ensures that the visibility configuration value (i.e. control bit, group bit, VMID value, mask value etc.) used for a given thread executed within the secure world is set appropriately such that event information relating to the execution of that thread is not visible (if required) to software of threads operating in the non-secure world. Moreover, the secure monitor 164 further ensures that these values held for threads operating in the secure world are not even visible to threads operating in the non-secure world.

Thus by way of overall summary, in an apparatus performing multi-threaded data processing event handling circuitry receives event information from the data processing circuitry indicative of an event which has occurred during the data processing operations. Visibility configuration storage holds a set of visibility configuration values, each visibility configuration value associated with a thread of the multiple threads and the event handling circuitry adapts its use of the event information to restrict visibility of the event information for software of threads other than the thread which generated the event information if a visibility configuration value for the thread which generated the event information has a predetermined value. This allows multi-threaded event monitoring to be supported, whilst protecting event information from a particular thread for which it is desired to limit its visibility to software of other threads.

In the present application, the words "configured to . . . " and "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. Apparatus for multi-threaded data processing comprising:
    data processing circuitry to perform data processing operations for each thread of multiple threads;
    event handling circuitry to receive event information from the data processing circuitry indicative of an event which has occurred during the data processing operations; and
    visibility configuration storage to hold a set of visibility configuration values, each visibility configuration value associated with a thread of the multiple threads,
    wherein the event handling circuitry is responsive on receipt of the event information to adapt its use of the event information to restrict visibility of the event information for software of threads other than the thread which generated the event information when a visibility configuration value for the thread which generated the event information has a predetermined value.

2. The apparatus as claimed in claim 1, wherein each visibility configuration value is not accessible to software of threads other than the corresponding thread.

3. The apparatus as claimed in claim 1, wherein the event handling circuitry comprises at least one event counter.

4. The apparatus as claimed in claim 3, wherein the at least one event counter comprises an event counter for each thread of the multiple threads.

5. The apparatus as claimed in claim 3, wherein the at least one event counter is configurable for multi-thread event counting and the at least one event counter counts events for more than one thread.

6. The apparatus as claimed in claim 5, wherein responsive to the at least one event counter performing multi-thread event counting the at least one event counter does not count events for the thread which generated the event information when a visibility configuration value for the thread has the predetermined value.

7. The apparatus as claimed in claim 1, wherein the visibility configuration storage is arranged to hold single bit visibility configuration values.

8. The apparatus as claimed in claim 1, wherein the visibility configuration storage is arranged to hold multi-bit visibility configuration values,
    wherein the event handling circuitry is responsive on receipt of the event information to adapt its use of the event information such that visibility of the event information for software of each of the multiple threads other than the thread which generated the event information is defined by a corresponding bit of a multi-bit visibility configuration value stored for the thread which generated the event information.

9. The apparatus as claimed in claim 1, wherein the thread which generated the event information is comprised in a group of threads,
    and the event handling circuitry is responsive on receipt of the event information to adapt its use of the event information such that the event information is visible to software of threads in the group of threads and such that the event information is not visible to software of threads not comprised in the group of threads.

10. The apparatus as claimed in claim 9, wherein the group of threads is defined by a group identifier, and the event handling circuitry is responsive on receipt of the event information to use the group identifier as the visibility configuration value.

11. The apparatus as claimed in claim 1, wherein the thread which generated the event information is comprised in a group of threads, and the visibility configuration value is given by a group visibility configuration value for the group of threads.

12. The apparatus as claimed in claim 1, wherein the event handling circuitry is responsive on receipt of the event information to adapt its use of the event information such that the event information is not visible to software of threads other than the thread which generated the event information when the visibility configuration value for the thread which generated the event information has the predetermined value.

13. The apparatus as claimed in claim 1, wherein the data processing circuitry is arranged to perform data processing operations for each thread of multiple threads at a selected execution level of multiple execution levels, wherein each visibility configuration value is not accessible to threads being executed at a lower execution level than the selected execution level.

14. The apparatus as claimed in claim 13, wherein the multiple execution levels comprise multiple exception levels.

15. The apparatus as claimed in claim 13, wherein the multiple execution levels comprise multiple security levels.

16. The apparatus as claimed in claim 13, wherein the apparatus is arranged to update the visibility configuration value when context switching between execution levels.

17. The apparatus as claimed in claim 1, wherein the data processing circuitry is arranged to perform the data processing operations in response to instructions and to select a subset of the instructions which it executes for profiling, the profiling being on the basis of event information generated for the subset of instructions, wherein the profiling comprises storing to a storage unit profiling data comprising the event information or further information derived from the event information, and wherein the data processing circuitry is arranged to prevent storage of the profiling data when the visibility configuration value for the thread which generated the event information has the predetermined value.

18. A data processing system comprising the apparatus as claimed in claim 1 and a storage unit.

19. A method of multi-threaded data processing comprising the steps of:
performing data processing operations for each thread of multiple threads;
storing a set of visibility configuration values, each visibility configuration value associated with a thread of the multiple threads;
receiving event information indicative of an event which has occurred during the data processing operations; and
adapting usage of the event information to restrict visibility of the event information for software of threads other than the thread which generated the event information when a visibility configuration value for the thread which generated the event information has a predetermined value.

20. Apparatus for multi-threaded data processing comprising:
means for performing data processing operations for each thread of multiple threads;
means for storing a set of visibility configuration values, each visibility configuration value associated with a thread of the multiple threads;
means for receiving event information from the means for performing data processing operations indicative of an event which has occurred during the data processing operations; and
means for adapting usage of the event information to restrict visibility of the event information for software of threads other than the thread which generated the event information when a visibility configuration value for the thread which generated the event information has a predetermined value.

21. A non-transitory, computer-readable storage medium storing software instructions, which when executed on a computing device, cause the computing device to carry out the method of claim 19.

* * * * *